(12) United States Patent
O'Brien

(10) Patent No.: US 6,294,612 B1
(45) Date of Patent: Sep. 25, 2001

(54) HIGHLY FLUORINATED ION EXCHANGE/ NONFUNCTIONAL POLYMER BLENDS

(75) Inventor: William G. O'Brien, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/241,671

(22) Filed: Feb. 2, 1999

Related U.S. Application Data

(60) Provisional application No. 60/073,406, filed on Feb. 2, 1998.

(51) Int. Cl.⁷ ............................................. C08L 27/12
(52) U.S. Cl. ................................. 525/199; 525/200
(58) Field of Search ............................ 525/199, 200

(56) References Cited

U.S. PATENT DOCUMENTS

| | | | |
|---|---|---|---|
| 3,308,107 | 3/1967 | Seiman et al. | |
| 4,754,009 | 6/1988 | Squire | 526/247 |
| 5,397,829 | 3/1995 | Morgan et al. | 524/463 |
| 5,408,020 | 4/1995 | Hung et al. | 526/247 |
| 5,478,905 | 12/1995 | Anolick et al. | 526/254 |
| 5,637,663 | 6/1997 | Anolick et al. | 526/254 |
| 5,663,255 | 9/1997 | Anolick et al. | 526/254 |
| 5,795,668 | * 8/1998 | Banerjee | 429/33 |

FOREIGN PATENT DOCUMENTS 6-231778   8/1994   (JP) .

\* cited by examiner

*Primary Examiner*—Nathan M. Nutter

(57) ABSTRACT

The invention provides a polymeric composition comprising a blend of highly fluorinated ion exchange polymer and highly fluorinated nonfunctional polymer, the blend having interpenetrating continuous phases of the highly fluorinated nonfunctional polymer and the highly fluorinated ion exchange polymer. Further the invention provides for liquid compositions comprising a highly fluorinated solvent, a highly fluorinated ion exchange polymer precursor and a highly fluorinated nonfunctional polymer with the polymers being miscible with each other in the solvent. The compositions are useful for making ion exchange membranes. Membranes of the compositions have enhanced tensile properties.

12 Claims, 5 Drawing Sheets

HIGHLY FLUORINATED ION EXCHANGE/ NONFUNCTIONAL POLYMER BLENDS

RELATED APPLICATIONS

This application claims benefit of U.S. Provisional Application No. 60/073,406, filed Feb. 2, 1998.

FIELD OF THE INVENTION

The present invention relates to blends of highly fluorinated ion exchange polymers and highly fluorinated nonfunctional polymer which are useful in the manufacture of membranes for electrochemical cells.

BACKGROUND OF THE INVENTION

Highly fluorinated ion exchange polymers are well known for use in making membrane separators for electrochemical cells. Such cells typically employ a membrane of ion exchange polymer which serves as a physical separator between the anode and cathode while also serving as an electrolyte. Cells with membrane separators can be operated as electrolytic cells for the production of electrochemical products or they may be operated as fuel cells for the production of electrical energy.

Highly fluorinated, and particularly perfluorinated, ion exchange polymer membranes are well suited for use in electrochemical cells due to excellent chemical resistance, long life, and high conductivity. However, membranes of such polymers do not have a high tensile strength. Moreover, the membranes during use must have a certain water content to be conductive and, in some applications, are in contact with aqueous solutions. The membranes typically swell under such conditions which further decreases tensile strength. Accordingly, for some applications, such as chloralkali electrolytic cells, it is necessary for the membranes to be reinforced with fabrics to provide the required strength. For other applications such as fuel cells, unreinforced polymer is adequate to provide the required strength when the membranes have a thickness of at least about 50 $\mu$m. However, increased strength is desired, especially to facilitate handling during manufacture and in end use processing operations. Membranes with increased tensile strength but without woven reinforcements are desired, particularly very thin, high performance membranes.

Highly fluorinated nonfunctional polymers are particularly useful for applications which experience weathering, harsh chemicals or other severe conditions. However, since they also have a very low surface energy, it is difficult to get such polymers to adhere to substrates. Highly fluorinated polymers with improved adhesion properties are desired for some applications.

SUMMARY OF THE INVENTION

The invention provides a polymeric composition comprising a blend of highly fluorinated ion exchange polymer and highly fluorinated nonfunctional polymer, the blend having interpenetrating continuous phases of the highly fluorinated nonfunctional polymer and the highly fluorinated ion exchange polymer. Preferably, the highly fluorinated nonfunctional polymer has a glass transition temperature of at least about 80° C. It is also preferable for the nonfunctional polymer to be perfluorinated. Most preferred nonfunctional polymers are selected from the group consisting of amorphous polymers of perfluoro-2,2-dimethyl-1,3,-dioxole.

In another preferred form of the invention, the highly fluorinated nonfunctional polymer comprises at least about 10 weight % of the composition, more preferably, at least about 15 weight % of the composition and, most preferably, about 20 weight % to about 40 weight % of the composition.

In a preferred composition, the highly fluorinated ion exchange polymer is selected from the group consisting of ion exchange polymers with sulfonate, carboxylate, phosphonate, imide, sulfonimide and sulfonamide functional groups, most preferably, the highly fluorinated ion exchange polymer is perfluorinated and has sulfonate ion exchange groups.

It is preferred for the ion exchange polymer of the composition to have an ion exchange ratio (IXR) of about 9 to about 14, most preferably, about 10 to about 13.

The invention is advantageously employed in a membrane made of the composition. Such membranes have a higher tensile strength than membranes of the ion exchange polymer alone. The invention is especially useful for very thin membranes, preferably those with a thickness of less than about 50 $\mu$m.

The invention also provides a liquid composition comprising a highly fluorinated solvent, a highly fluorinated ion exchange polymer precursor and a highly fluorinated nonfunctional polymer with the polymers being miscible with each other in the solvent. Preferably, the highly fluorinated ion exchange polymer precursor has sulfonyl fluoride groups.

The invention also provides a method for making an ion exchange membrane comprising:

forming a liquid composition of a highly fluorinated solvent, a highly fluorinated ion exchange polymer precursor and a highly fluorinated nonfunctional polymer, the polymers being miscible with each other in the solvent;

depositing the liquid composition on a substrate;

removing the highly fluorinated solvent from the composition to form a membrane; and removing the membrane from the substrate.

Preferably, in the method of the invention, the ion exchange polymer precursor has sulfonyl fluoride groups and the method includes hydrolyzing the polymer to convert the sulfonyl fluoride groups to sulfonate groups.

The compositions are also useful for protective and other coating applications where the properties of highly fluorinated polymers are desired but with improved adhesion to substrates.

DETAILED DESCRIPTION

Ion Exchange Polymers

Figure 1:
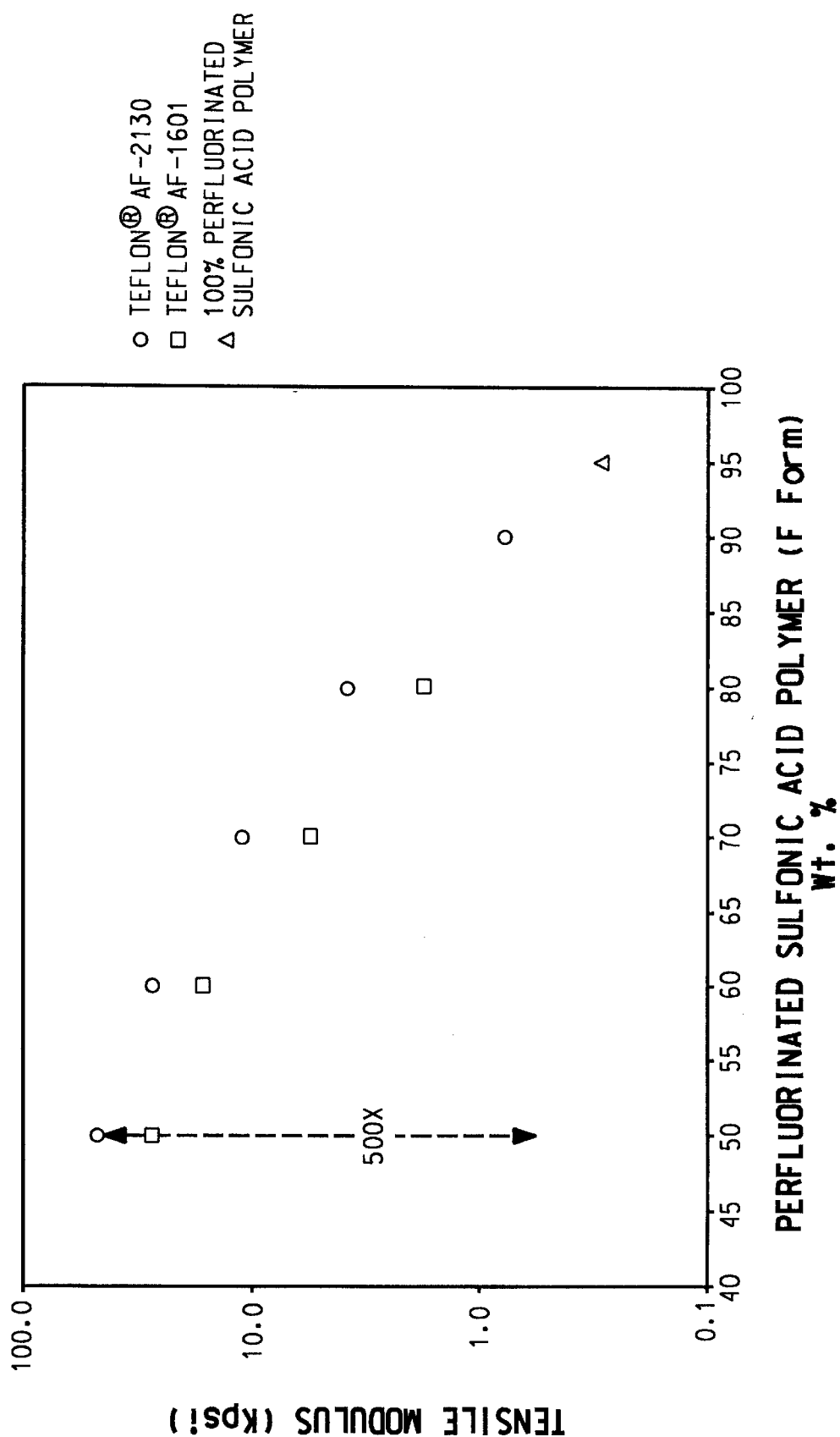
FIG. 1 is a graphical representation of tensile modulus of the films of the various compositions in accordance with the invention as made in Example 1, Parts A and B.

Highly fluorinated ion exchange polymers for use in accordance with this invention may be any number of fluoropolymers with ion exchange groups that are preferably selected from the group consisting of sulfonate, carboxylate, phosphonate, imide, sulfonimide and sulfonamide groups. "Highly fluorinated" means that at least about 90% of the total number of halogen and hydrogen atoms in the polymer are fluorine atoms. Most preferably, the polymer is perfluorinated.

It is also preferred for the ion exchange groups to be sulfonate ion exchange groups. The term "sulfonate ion exchange groups" is intended to refer to either to sulfonic acid groups or salts of sulfonic acid groups, preferably alkali metal or ammonium salts. Most preferably, the ion exchange groups are represented by the formula —$SO_3X$ wherein X is H, Li, Na, K or $N(R^1)(R^2)(R^3)(R^4)$ and $R_1$, $R^2$, $R^3$, and $R^4$ are the same or different and are H, $CH_3$ or $C_2H_5$. For applications where the polymer is to be used for proton exchange such as in fuel cells, the sulfonic acid form of the polymer is preferred, i.e., where X is H in the formula above. For use in the chloralkali electrolytic cells, the sodium salt form of the polymer preferred, i.e., where X is Na in the formula above.

Preferably, the polymer comprises a polymer backbone with recurring side chains attached to the backbone with the side chains carrying the ion exchange groups. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the ion exchange group or its precursor, e.g., a sulfonyl halide group such a sulfonyl fluoride (—$SO_2F$), which can be subsequently hydrolyzed to a sulfonate ion exchange group. For example, copolymers of a first fluorinated vinyl monomer together with a second fluorinated vinyl monomer having a sulfonyl fluoride group (—$SO_2F$) can be used. Possible first monomers include tetrafluoroethylene (TFE), hexafluoropropylene, vinyl fluoride, vinylidine fluoride, trifluorethylene, chlorotrifluoroethylene, perfluoro (alkyl vinyl ether), and mixtures thereof. Possible second monomers include a variety of fluorinated vinyl ethers with sulfonate ion exchange groups or precursor groups which can provide the desired side chain in the polymer. Additional monomers can also be incorporated into these polymers if desired.

A class of preferred polymers for use in the present invention includes a highly fluorinated, most preferably perfluorinated, carbon backbone and the side chain represented by the formula —$(O-CF_2CFR_f)_a-O-CF_2CFR'_fSO_3X$, wherein $R_f$ and $R_f$ are independently selected from F, Cl or a perfluorinated alkyl group having 1 to 10 carbon atoms, a=0, 1 or 2, and X is H, Li, Na, K or $N(R^1)(R^2)(R^3)(R^4)$ and $R^1$, $R^2$, $R^3$, and $R^4$ are the same or different and are H, $CH_3$ or $C_2H_5$. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and the side chain is represented by the formula —O—$CF_2CF(CF_3)$—O—$CF_2CF_2SO_3X$, wherein X is as defined above. Polymers of this type are disclosed in U.S. Pat. No. 3,282,875 and can be made by copolymerization of tetrafluoroethylene (TFE) and the perfluorinated vinyl ether $CF_2$=CF—O—$CF_2CF(CF_3)$—O—$CF_2CF_2SO_2F$, perfluoro (3,6-dioxa-4-methyl-7-octenesulfonyl fluoride) (PDMOF), followed by conversion to sulfonate groups by hydrolysis of the sulfonyl halide groups and ion exchanging if needed to convert to the desired form. One preferred polymer of the type disclosed in U.S. Pat. Nos. 4,358,545 and 4,940,525 has the side chain —O—$CF_2CF_2SO_3X$, wherein X is as defined above. This polymer can be made by copolymerization of tetrafluoroethylene (TFE) and the perfluorinated vinyl ether $CF_2$=CF—O—$CF_2CF_2SO_2F$, perfluoro(3-oxa-4-pentenesulfonyl fluoride) (POPF), followed by hydrolysis and ion exchanging if needed.

In preferred forms of the present invention, highly fluorinated carboxylate polymer, i.e., having carboxylate ion exchange groups in the resulting composite membrane, is also employed as will be discussed in more detail hereinafter. The term "carboxylate ion exchange groups" is intended to refer to either to carboxylic acid groups or salts of carboxylic acid groups, preferably alkali metal or ammonium salts. Most preferably, the ion exchange groups are represented by the formula —$CO_2X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. For use in the chloralkali process, the sodium salt form of the polymer is preferred, i.e., where X is Na in the formula above. Preferably, the polymer comprises a polymer backbone with recurring side chains attached to the backbone with the side chains carrying the carboxylate ion exchange groups. Polymers of this type are disclosed in U.S. Pat. No. 4,552,631 and most preferably have the side chain —O—$CF_2CF(CF_3)$—O—$CF_2CF_2CO_2X$. This polymer can be made by copolymerization of tetrafluoroethylene (TFE) and the perfluorinated vinyl ether $CF_2$=CF—O—$CF_2CF(CF_3)$—O—$CF_2CF_2CO_2CH_3$, methyl ester of perfluoro(4,7-dioxa-5-methyl-8-nonenecarboxylic acid) (PDMNM), followed by conversion to carboxylate groups by hydrolysis of the methyl carboxylate groups and ion exchanging if needed to convert to the desired form. While other esters can be used for film or bifilm fabrication, the methyl ester is the preferred since it is sufficiently stable during normal extrusion conditions.

The polymer can be hydrolyzed in a 30 weight % aqueous solution of potassium hydroxide. A suitable procedure includes immersing the membrane in the solution and then heating the solution slowly to 90° C. After at least 3 hours and preferably 5 hours, the membrane is removed from the solution and washed in deionized water several times until the wash water is neutral. The membrane is then boiled in deionized water for about an hour. If it is necessary to convert the membrane to the acid form, it can be put in a 10–15% aqueous solution of nitric acid. The bath is heated to 90° C. for about 45 minutes. If more complete conversion to the acid form is necessary, a brief deionized water rinse followed by a second acid bath treatment can be carried out. Then the membrane is removed from the acid bath and washed in deionized water until the wash water is neutral.

In this application, "ion exchange ratio" or "IXR" is defined as number of carbon atoms in the polymer backbone in relation to the ion exchange groups. A wide range of IXR values for the polymer are possible. Typically, however, the IXR range used for layers of the laminated membrane is usually about 7 to about 33. For perfluorinated polymers of the type described above, the ion exchange capacity of a polymer is often expressed in terms of equivalent weight (EW). For the purposes of this application, equivalent weight (EW) is defined to be the weight of the polymer in acid form required to neutralize one equivalent of NaOH. In the case of a sulfonate polymer where the polymer comprises a perfluorocarbon backbone and the side chain is —O—$CF_2$—$CF(CF_3)$—O—$CF_2$—$CF_2$—$SO_3H$ (or a salt thereof), the equivalent weight range which corresponds to an IXR of about 7 to about 33 is about 700 EW to about 2000

EW. IXR for this polymer can be related to equivalent weight using the following formula: 50 IXR+344=EW. While generally the same IXR range is used for sulfonate polymers disclosed in U.S. Pat. Nos. 4,358,545 and 4,940,525, the equivalent weight is somewhat lower because of the lower molecular weight of the monomer unit containing an ion exchange group. For the IXR range of about 7 to about 33, the corresponding equivalent weight range is about 500 EW to about 1800 EW. IXR for this polymer can be related to equivalent weight using the following formula: 50 IXR+178=EW. For carboxylate polymers having the side chain —O—$CF_2CF(CF_3)$—O—$CF_2CF_2CO_2X$, a useful IXR range is about 12 to about 21 which corresponds to about 900 EW to about 1350 EW. IXR for this polymer can be related to equivalent weight using the following formula: 50 IXR+308=EW.

IXR is used in this application to describe either hydrolyzed polymer which contains ion exchange groups or unhydrolyzed polymer which contains precursor groups which will subsequently be converted to the ion exchange groups during the manufacture of the membranes.

The highly fluorinated sulfonate polymer used in the process of the invention preferably has an ion exchange ratio of about 8 to about 23, preferably about 9 to about 14 and most preferably about 10 to about 13.

Nonfunctional Fluoropolymers

The highly fluorinated nonfunctional fluoropolymers useful for the practice of the present invention are fluoropolymers which can be blended with the ion exchange polymer in its precursor forms to improve tensile and/or other properties in use. As for the ion exchange polymers, "highly fluorinated" means that at least 90% of the total number of halogen and hydrogen atoms in the polymer are fluorine atoms. For increased resistance to thermal and chemical degradation, the nonfunctional polymer is preferably perfluorinated.

It has been discovered that the increase in tensile strength in the polymer blends in accordance with the invention is related to the glass transition temperature (Tg) of the polymer. Improved tensile strengths result with increased Tg's. Preferably, the highly fluorinated nonfunctional polymer has a glass transition temperature of at least about 80° C. Tg's in the range of about 100 to about 210° C. are especially advantageous.

In addition, the ion exchange and the nonfunctional polymers must be capable of forming interlocking continuous phases. As will become more apparent in the description of the manufacture of the composition which follows, one way of forming this structure with some polymers is to employ a solvent or mixture of solvents in which both polymers (ion exchange polymer in precursor form) are miscible and removing the solvent under conditions such that the interlocking continuous phase structure is formed. Alternatively, the polymers can be mixed sufficiently intimately by melt blending. Preferably, when employed in membranes, the polymers form a structure which results in substantially transparent membranes. It has been found that some minor haziness is not detrimental, especially in thick membranes.

Especially preferred nonfunctional polymers are selected from the group consisting of amorphous homopolymers and copolymers of perfluoro-2,2-dimethyl-1,3,-dioxole (PDD) such as those disclosed in U.S. Pat. No. 4,754,009. Copolymers of perfluoro-2-methylene-4-methyl-1,3-dioxolane (PMD) and TFE such as those disclosed in are also advantageous since they provide similar properties to the amorphous copolymers of (PDD) but at potentially lower cost. Amorphous copolymers of tetrafluoroethylene and hexafluoropropylene such as those disclosed in U.S. Pat. Nos. 5,478,905, 5,663,255, and 5,637,663 are also useful provided that the Tg of the polymer is sufficient to provide enhanced strength.

A variety of amorphous copolymers of PDD with TFE or chlorotrifluoroethylene are commercially available from E.I. du Pont de Nemours and Company, Wilmington, Delaware under the trademark TEFLON® AF. Amorphous copolymers of tetrafluoroethylene and hexafluoropropylene are available under the trademark TEFLON® SF.

The proportions of the ion exchange polymer and the nonfunctional polymer can vary widely. However, for most electrochemical uses, it is usually desirable for the nonfunctional polymer to be a minor component of the composition since ionic conductivity is higher with higher ion exchange polymer content. Preferably, the highly fluorinated nonfunctional polymer comprises at least about 10 weight % of the composition. More preferably, the nonfunctional polymer comprises at least about 15 weight % of the composition and, most preferably, about 20 weight % to about 40 weight % of the composition.

Manufacture and Use of the Compositions

The highly fluorinated ion exchange polymer and the highly fluorinated nonfunctional polymer can be blended using variety of known techniques. Blending in solution using a solvent or solvent mixture which is capable of dissolving both polymers has been found to be useful. For miscibility of the ion exchange polymer with the nonfunctional polymer and/or solvent, the ion exchange polymer is used in precursor form. For example, for perfluorinated sulfonic acid polymer, perfluorinated sulfonyl fluoride polymer is used. If desired, two different solvents, one for the ion exchange polymer and one for the nonfunctional polymer, can be used. Fluorinated solvents, particularly perfluorinated solvents are especially useful. Such solvents include mixtures of perfluoro(methyl-di-n-butyl) amine and perfluoro (tri-n-butylamine) such as those sold under the trademark FLUOROINERT FC-40® by 3M of St. Paul, Minn. Other possible solvents include perfluorooctane, perfluoroalkylethylenes, and mixtures thereof. After mixing, solid compositions are formed by removing the solvent. Preferably, the solvents are recovered and reused. Ion exchange polymer precursors are converted to ionic form such as by hydrolysis in the case of perfluorinated sulfonyl fluoride polymers.

The liquid compositions of the highly fluorinated solvent, the highly fluorinated ion exchange polymer precursor and the highly fluorinated nonfunctional polymer are an especially useful form of the compositions. One preferred use of the compositions is in the manufacture of films or membranes for use in electrochemical applications. In accordance with the invention, ion exchange membranes are made by depositing the liquid composition on a substrate, removing the highly fluorinated solvent from the composition to form a membrane, and removing the membrane from the substrate. In the preferred form of the invention in which polymer precursor has sulfonyl fluoride groups, the method includes hydrolyzing the polymer to convert the sulfonyl fluoride groups to sulfonate groups.

Melt blending is also useful for the manufacture of the composition. Known melt processing techniques can be employed in which the two polymers are heated to above their melting points and subjected to high shear conditions for sufficient time to provide intimate mixing.

Figure 2:
FIGS. 2, 3 and 4 are scanning electron micrographs of the surface of a hydrolyzed film of the composition of Example 1, Part A, Sample 1 (50/50 perfluorinated sulfonic acid/TEFLON® AF-2130) at 300×, 1000×and 3000×, respectively.
Figure 3:
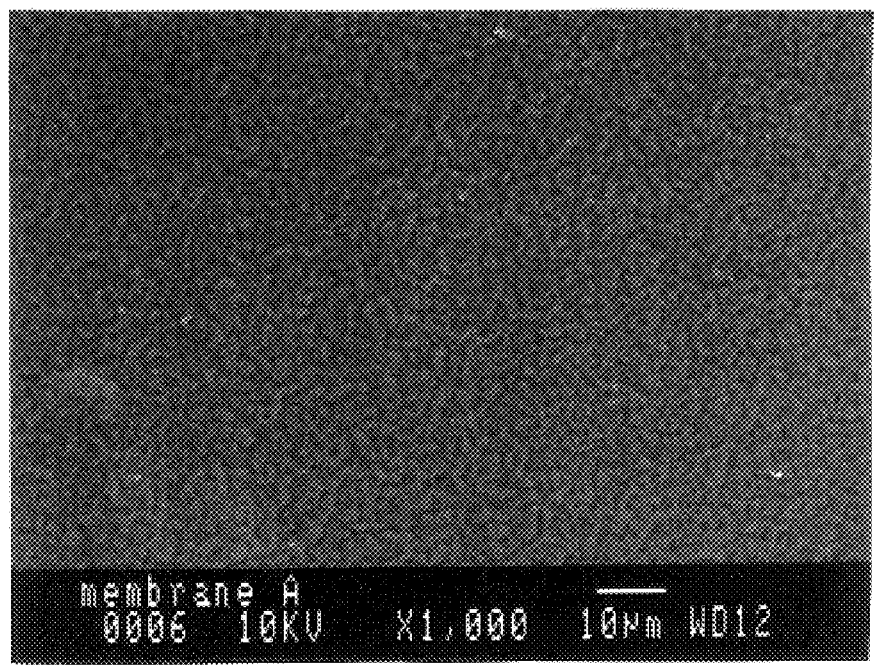
Figure 4:
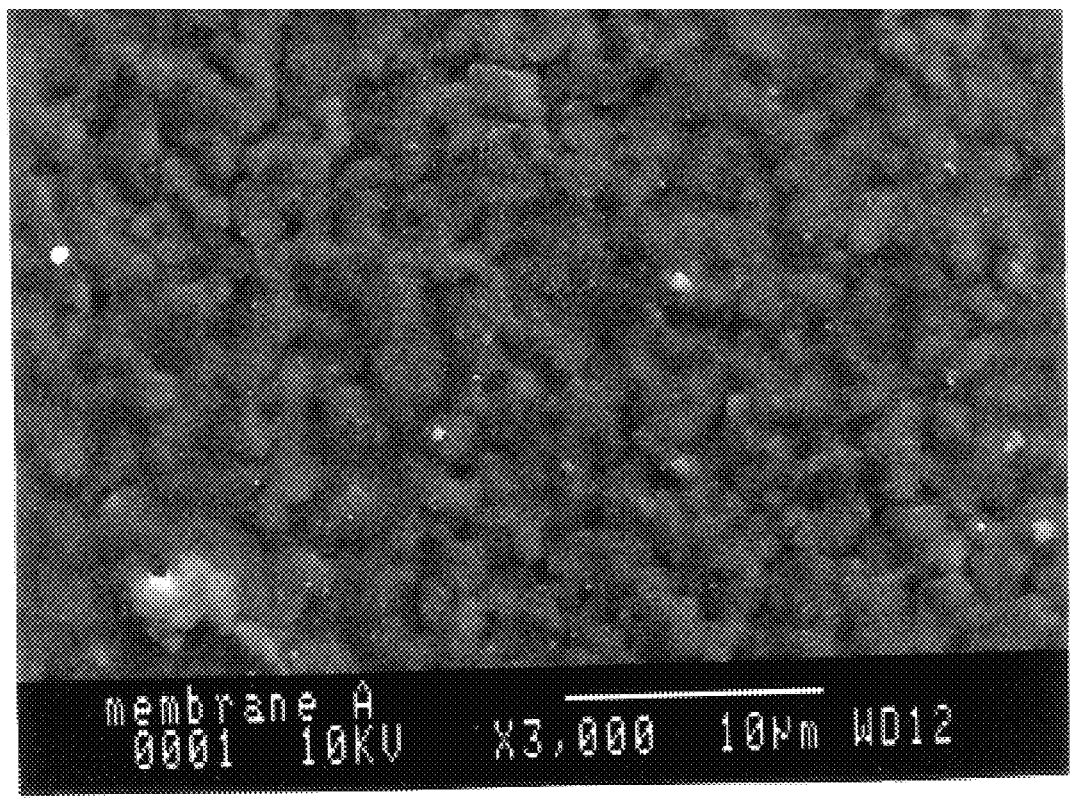

The compositions when employed the form of a film are preferably transparent. Using scanning electron microscopy (SEM), an interlocking continuous phase structure is seen which is believed to be responsible for the strength enhancement in the compositions. FIGS. 2, 3, and 4 are SEM photographs of the surface of the Example 1, Part A, sample 1 hydrolyzed film (50/50 perfluorinated sulfonic acid/ TEFLON® AF-2130) at 300×, 1000× and 3000×, respectively.

The invention is advantageously employed in the manufacture membranes. Such membranes of the compositions have a higher tensile strength than membranes of the ion exchange polymer alone but can have essentially the same electrochemical performance characteristics as an unreinforced membrane of the same thickness. Because of the improved tensile properties, membranes with enhanced performance can be provided when ion exchange polymer is employed which has lower IXR values than customarily used for membranes. In membranes of this type, IXR values of about 9 to about 14 are especially useful. For low IXR membranes, the swelling and thus increase in dimensions upon wetting is less than a corresponding membrane of only the ion exchange polymer.

The invention is also especially useful for very thin membranes, preferably those with a thickness of less than about 50 μm. Enhanced electrical performance can be achieved in these membranes due to decreased thickness while maintaining the tensile strength needed in use and during manufacture and processing.

The compositions are also useful for protective and other coating applications where the properties of highly fluorinated polymers are desired but with improved adhesion to substrates. Typically, for such application, a majority of the blend is comprised of the nonfunctional polymer.

EXAMPLES

Example 1

Liquid Compositions and Films of Perfluorinated $SO_2F$ Polymer and Nonfunctional Fluoropolymers Part A A 4% solids solution of perfluorinated sulfonyl fluoride polymer (copolymer of TFE and PDMOF - EW of 939 - IXR of 11.9) is made in a solvent mixture of perfluoro(methyl-di-n-butyl)amine and perfluoro(tri-n-butylamine), such mixture being sold under the trademark FLUOROINERT® FC-40 by 3M of St. Paul, Minn. A 6% solids solution of a co-polymer of perfluoro(1,3-dioxole); perfluoro(2,2-dimethyl-1,3-dioxole) (PDD) (85 mole %) and chlorotrifluoroethylene (CTFE) (15 mole %) sold under the trademark TEFLON® AF-2130 by E.I. du Pont de Nemours and Company, Wilmington, Del. is made in a solvent of perfluorooctane. Liquid mixtures of the two solutions are made such that the dried films provide polymer blend ratios ranging from 10 weight % to 50 weight % nonfunctional polymer described in Table 1. The liquids are warmed during mixing to avoid gelation and to insure good mixing. The mixtures made are fully miscible.

TABLE 1

| Sample | Wt. % $SO_2F$ Polymer | Wt % TEFLON ® AF |
|---|---|---|
| 1 | 50 | 50 |
| 2 | 60 | 40 |
| 3 | 70 | 30 |
| 4 | 80 | 20 |
| 5 | 90 | 10 |
| 6 | 100 | — |

Cast films are made from the mixtures by filling 9.5 cm×12 cm dams with 14.0 to 18.0 g of mixed solution to provide a dry film thickness of ~1.5 mils (~38 μm). For example, to make 10 g of a 50/50 blend of dry polymers, 125 g of 4% perfluorinated sulfonyl fluoride polymer solution and 83.3 g of 6% AF-2130 are needed. The final solids content is 4.8%. To make a 1.5 mil dry film (38 μm) assuming a 2.0 density of solvent and polymers, a 31 mil (790 μm) wet thickness is needed. For a 114 $cm^2$ enclosure, this corresponds to a 9 $cm^3$ volume, or 18 g of solution.

Films made this way are allowed to air dry at room temperature overnight. The dried films maintain good transparency over the entire blend range. The tensile modulus of the films is measured and the results are shown graphically in FIG. 1. The 100% perfluorinated sulfonyl fluoride polymer film is a very tacky, elastic film with about 100 to 200 psi (700–1400 kPa) tensile modulus. The 50/50 perfluorinated sulfonyl fluoride polymer/AF-2130 has a very dry, tough feel with tensile modulus in the 45,000 to 50,000 psi (300–350 MPa) range. As illustrated in FIG. 1, the addition of TEFLON® AF-2130 provides nearly a 500 X increase in tensile strength.

The Sample 1 film (50/50 perfluorinated sulfonyl fluoride polymer/AF-2130) membrane is hydrolyzed, acid exchanged and dried. When this film is boiled in water to rewet it, there is an approximately 10% increase in size in both the X and Y directions. This is substantially lower than 14% which is typical for membranes of only the sulfonic acid polymer.

While clear to the eye, films under surface scanning electron microscopy show an interlocking continuous phase structure which is believed to be responsible for the strength enhancement associated with this blending. FIGS. 2, 3, and 4 are scanning electron micrographs (SEMs) of the surface of the Sample 1 film (50/50 perfluorinated sulfonyl fluoride/ TEFLON® AF-2130) at 300×, 1000×, and 3000×, respectively. SEM is performed on the films after hydrolysis.

Part B

The procedures of Part A are repeated except using a nonfunctional copolymer which does not contain chlorine. The polymer used is PDD (70%) and TFE (30%) which is sold by E. I. du Pont de Nemours and Company under the trademark Teflon® AF- 1601. The results are shown graphically in FIG. 1. Near equivalent performance to AF-2130 is achieved with the use of TEFLON® AF- 1601 but these blends are slightly weaker. This strength variation tracks the Tg of the materials. (AF-1601: 160° C.; AF-2130: 210 C.).

Part C

Using the procedures of Part A, 50/50 film blends of the same perfluorinated sulfonyl fluoride polymer (EW of 939 - IXR of 11.9) are also made with a copolymer of PDD and TFE which is sold under the trademark TEFLON® AF-2400, a HFP/TFE copolymer sold under the trademark TEFLON® SF-50, and a PMD/TFE copolymer. A description of this group of 50/50 blend films is provided in Table 2 below. All polymers are miscible in the liquids used and yield clear, dry films when cast.

TABLE 2

| Trademark | Monomers | Monomer Ratio | Tg | 50/50 Blend Film |
|---|---|---|---|---|
| TEFLON ® AF-2400 | PDD/TFE | 85/15 | 240° C. | Very strong film, non-tacky surface |
| TEFLON ® SF-50 | HFP/TFE | 50/50 | 55° C. | Weak film similar to 100% perfluorinated sulfonyl fluoride polymer, tacky surface |
| | PMD/TFE | 70/30 | 100° C. | Weaker than TEFLON ® AF-1601 blend but much stronger than 100% perfluorinated sulfonyl fluoride polymer, non-tacky surface |

Example 2

Perfluorinated Sulfonyl Fluoride Polymer/ Nonfunctional Fluoropolymer Melt Blending Two 80/20 weight ratio blends of perfluorinated sulfonyl fluoride polymer (PDMOF and TFE - 939 EW - IXR 11.9) and nonfunctional polymers are made in 140 g batches in Haake Rheomix devices. The first employs TEFLON® AF-1600 (70% PPD/30% TFE) and the second employs 70% PMD/30% TFE. Both compositions melt blend easily using a 15 minute processing time at 200° C. to 250° C. processing temperatures. The mixed materials are separated from screw elements and hot pressed into ~15 mil films. The PMD/TFE containing blend maintains transparency at all temperatures. TEFLON® AF-1600 blend develops a slight haze on cooling. Upon reheating to >1 50° C. the haze disappears and clarity returns.

Example 3

Electrochemical Cell (Fuel Cell) Performance of Membranes of Perfluorinated Sulfonic Acid/ Nonfunctional Fluoropolymer Blend Compositions Membranes of TFE/PDMOF polymer of two different equivalent weights and several types of nonfinctional fluoropolymer are made according to the procedures of Example 1. The resulting membranes are evaluated for performance in fuel cells. The cast membranes are between 1.0 and 1.5 mil (25–38 μm) thick. The compositions of the membranes are listed in Table 3.

TABLE 3

| Fuel Cell Run | % SO$_2$F Polymer/ % Teflon ® AF | SO$_2$F Polymer EW/IXR | Teflon ® AF Designation |
|---|---|---|---|
| 1 | 90/10 | 939/11.9 | AF-1600 |
| 2 | 90/10 | 939/11.9 | AF-2130 |
| 3 | 90/10 | 888/10.9 | AF-1600 |
| 4 | 90/10 | 888/10.9 | AF-2400 |

Since these membranes at this thickness are not very easy to handle for the application of a catalyst coating, two layers of the membrane are laminated together before hydrolysis to increase thickness. Also prior to hydrolysis, a catalyst coating is applied to each side of the laminated membranes by laminating a decal formed by casting a catalyst ink containing TFE/PDMOF copolymer in a fluorinated solvent. The resulting catalyst coated membranes (CCMs) are hydrolyzed using the method described in U. S. Pat. No. 5,330,860. The CCMs have a final catalyst loading of 0.3 mg platinum/cm$^2$ on both the cathode and anode sides.

Figure 5:
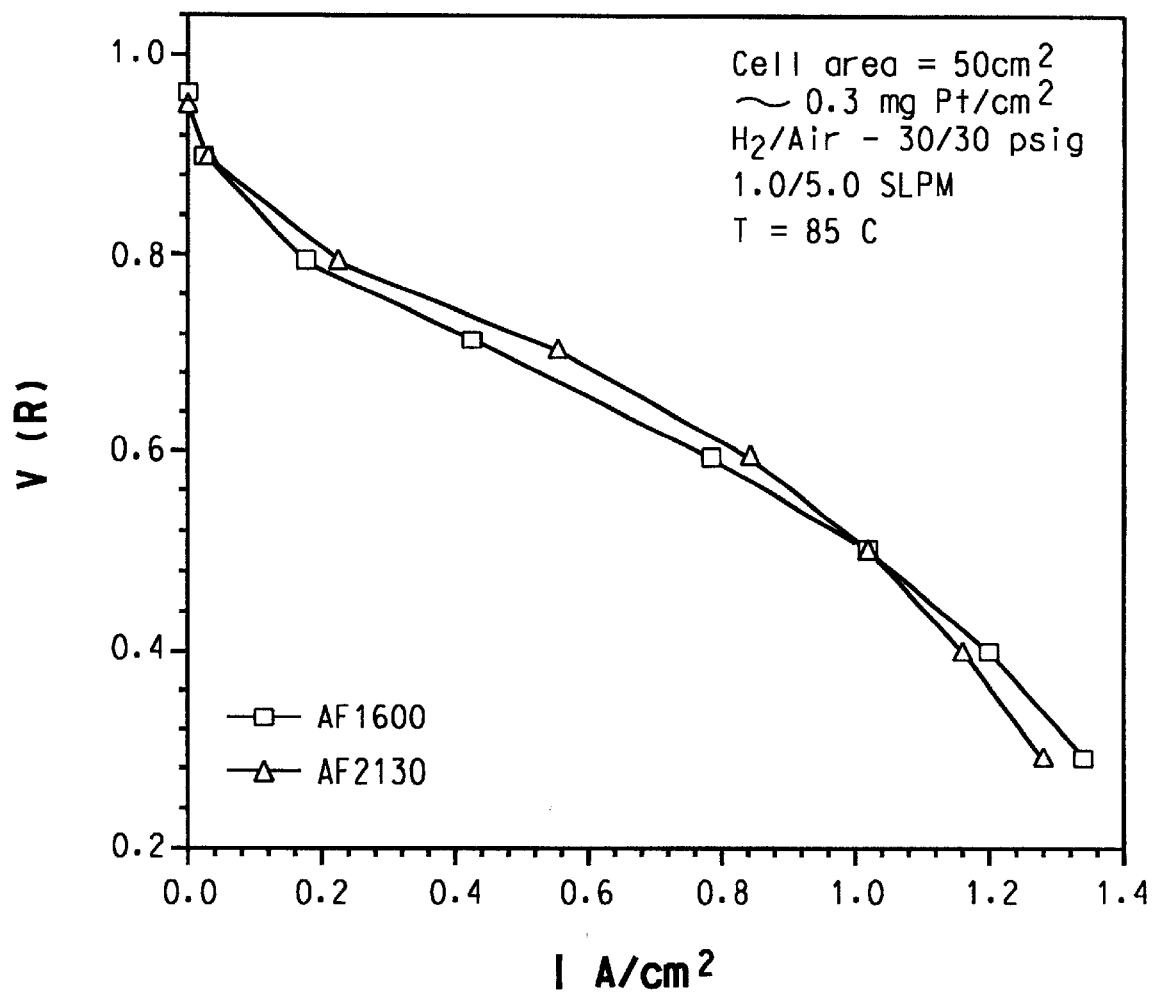
FIGS. 5 and 6 are graphical representations of voltage plotted against current per square centimeter for the fuel cell employing preferred membranes in accordance with the invention in which the equivalent weight of the ion exchange polymer is 888 (IXR - 10.9) and 939 (IXR - 11.9), respectively.
Figure 6:
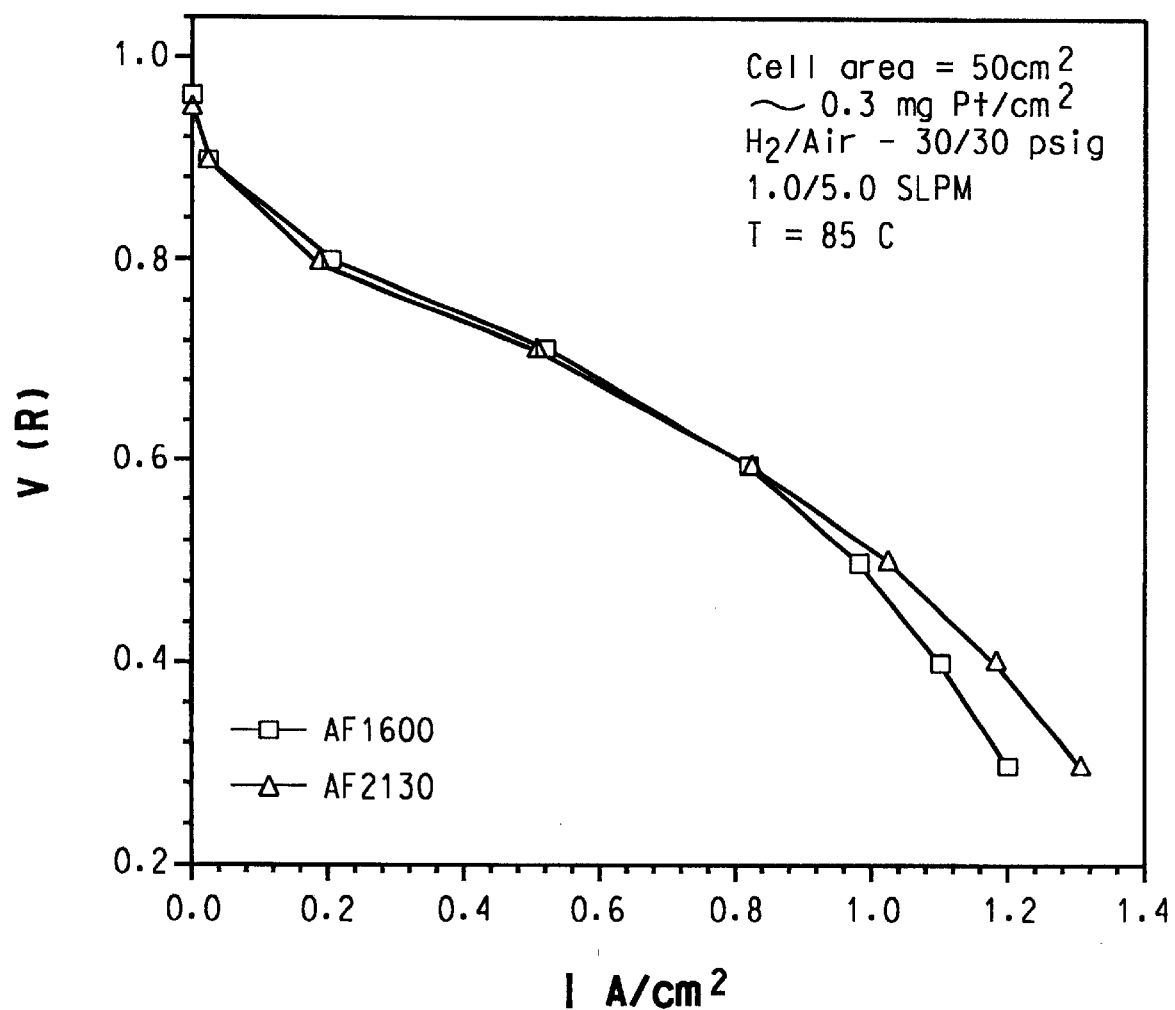

The fuel cell performance of these membranes is shown in FIGS. 5 and 6.

What is claimed is:

1. A polymeric composition comprising a blend of highly fluorinated ion exchange polymer and highly fluorinated nonfunctional polymer, said blend having interpenetrating continuous phases of said highly fluorinated nonfunctional polymer and said highly fluorinated ion exchange polymer.

2. The composition of claim 1 wherein said highly fluorinated nonfunctional polymer has a glass transition temperature of at least about 80° C.

3. The composition of claim 1 wherein said nonfunctional polymer is perfluorinated.

4. The composition of claim 1 wherein said highly fluorinated nonfinctional polymer is selected from the group consisting of amorphous polymers of perfluoro-2,2-dimethyl-1,3,-dioxole.

5. The composition of claim 1 wherein said highly fluorinated nonfunctional polymer is selected from the group consisting of amorphous copolymers of perfluoro-2-methylene-4-methyl-1,3-dioxolane and TFE.

6. The composition of claim 1 wherein said highly fluorinated nonfunctional polymer comprises at least about 10 weight % of said composition.

7. The composition of claim 1 wherein said highly fluorinated nonfunctional polymer comprises at least about 15 weight % of said composition.

8. The composition of claim 1 wherein said highly fluorinated nonfunctional polymer comprises about 20 weight % to about 40 weight % of said composition.

9. The composition of claim 1 wherein said highly fluorinated ion exchange polymer is selected from the group consisting of ion exchange polymers with sulfonate, carboxylate, phosphonate, imide, sulfonimide and sulfonamide functional groups.

10. The composition of claim 1 wherein said highly fluorinated ion exchange polymer is perfluorinated and has sulfonate ion exchange groups.

11. The composition of claim 1 wherein said ion exchange polymer has an ion exchange ratio of about 9 to about 14.

12. The composition of claim 1 wherein said ion exchange polymer has an ion exchange ratio of about 10 to about 13.

* * * * *

UNITED STATES PATENT AND TRADEMARK OFFICE
CERTIFICATE OF CORRECTION

PATENT NO. : 6,294,612 B1
DATED : September 25, 2001
INVENTOR(S) : William G. O'Brien It is certified that error appears in the above-identified patent and that said Letters Patent is hereby corrected as shown below:

Column 10,
Line 28, delete "nonfinctional" and insert -- nonfunctional --.

Signed and Sealed this

Tenth Day of January, 2006

JON W. DUDAS
*Director of the United States Patent and Trademark Office*